(12) United States Patent
J et al.

(10) Patent No.: US 11,682,307 B2
(45) Date of Patent: Jun. 20, 2023

(54) SITUATION-AWARE, INTELLIGENT DATA-SYNCHRONIZATION METHODS FOR UAV-INSPECTION APPLICATIONS

(71) Applicant: Honeywell International Inc., Charlotte, NC (US)

(72) Inventors: Kirupakar J, Madurai (IN); Nitin Mandloi, Bangalore (IN); Thandava Krishna Edara, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 278 days.

(21) Appl. No.: 17/019,029

(22) Filed: Sep. 11, 2020

(65) Prior Publication Data

US 2022/0013015 A1 Jan. 13, 2022

(30) Foreign Application Priority Data

Jul. 7, 2020 (IN) .............................. 202011028824

(51) Int. Cl.
*G08G 5/00* (2006.01)
*H04W 4/50* (2018.01)
(Continued)

(52) U.S. Cl.
CPC ......... *G08G 5/0013* (2013.01); *B64C 39/024* (2013.01); *G07C 5/008* (2013.01);
(Continued)

(58) Field of Classification Search
CPC .. G08G 5/0013; G08G 5/0069; G08G 5/0026; G08G 5/0052; G08G 5/00;
(Continued)

(56) References Cited

U.S. PATENT DOCUMENTS 8,511,606 B1 * 8/2013 Lutke .................... B64C 39/024
320/109
9,282,144 B2 3/2016 Tebay et al.
(Continued)

FOREIGN PATENT DOCUMENTS

CA         3022235 A1 * 4/2019 ........... B64C 39/024
CN       105120011 A    12/2015
WO    WO-2021160484 A1 * 8/2021

OTHER PUBLICATIONS

Data Sync Drone Flight Data Management features from Airdata UAV, retrieved from https://airdata.com/features#tab-panel-0 on Sep. 10, 2020, 8 pp.

*Primary Examiner* — Yonel Beaulieu
(74) *Attorney, Agent, or Firm* — Shumaker & Sieffert, P.A.

(57) ABSTRACT

Unmanned aerial vehicle (UAV) systems are described that determine when to automatically transfer telemetry data from a UAV to a ground-based computing device by monitoring one or more context states of the UAV. In some examples, a UAV system includes a UAV; a ground-based computing device; and processing circuitry configured to acquire data from one or more sensors on the UAV; store the data at a local storage device on the UAV; maintain a state machine configured to monitor one or more context states of the UAV system; determine, based on the one or more context states, that a current situation of the UAV system meets minimum criteria for transferring the data from the UAV to the ground-based computing device; and automatically transfer, based on the determination, the data from the UAV to the ground-based computing device.

20 Claims, 6 Drawing Sheets

(51) Int. Cl.
*H04W 4/40* (2018.01)
*B64C 39/02* (2023.01)
*G07C 5/00* (2006.01)
*G07C 5/08* (2006.01)
*B64U 50/19* (2023.01)

(52) U.S. Cl.
CPC ......... *G07C 5/0841* (2013.01); *G08G 5/0069* (2013.01); *H04W 4/40* (2018.02); *H04W 4/50* (2018.02); *B64U 50/19* (2023.01)

(58) Field of Classification Search
CPC ............ B64C 39/024; B64C 2201/042; B64C 2201/122; B64C 2201/127; B64C 2201/146; B64C 39/02; G07C 5/008; G07C 5/0841; G07C 5/085; G07C 5/00; H04W 4/40; H04W 4/50; H04W 4/38; H04W 4/00; H04L 67/12; G05D 1/00
See application file for complete search history.

(56) References Cited

U.S. PATENT DOCUMENTS

| | | | |
|---|---|---|---|
| 9,592,911 B2 | 3/2017 | Liu et al. | |
| 2006/0167597 A1 | 7/2006 | Bodin et al. | |
| 2009/0024261 A1 | 1/2009 | Rouquette et al. | |
| 2013/0233964 A1* | 9/2013 | Woodworth | B64C 25/58 244/175 |
| 2016/0363929 A1* | 12/2016 | Clark | B64C 39/024 |
| 2018/0118340 A1* | 5/2018 | Russo | A01K 59/00 |
| 2018/0315141 A1* | 11/2018 | Hunn | G06F 9/547 |
| 2020/0045765 A1* | 2/2020 | Veeramallu | H04W 4/70 |
| 2020/0184706 A1* | 6/2020 | Speasl | H04L 9/14 |
| 2020/0218288 A1* | 7/2020 | Johnson | G01S 15/93 |
| 2021/0099848 A1* | 4/2021 | Ruan | H04W 4/44 |
| 2021/0247369 A1* | 8/2021 | Nottrott | G01N 33/0047 |
| 2021/0286355 A1* | 9/2021 | Chan | G05B 19/042 |
| 2022/0013015 A1* | 1/2022 | J | B64C 39/024 |
| 2022/0075546 A1* | 3/2022 | Potyraj | G06F 9/5072 |
| 2022/0083987 A1* | 3/2022 | Bhunia | G05D 1/101 |
| 2022/0169401 A1* | 6/2022 | Di Cosola | B64F 1/362 |
| 2022/0244127 A1* | 8/2022 | Aubrey | G08G 5/0013 |

* cited by examiner

SITUATION-AWARE, INTELLIGENT DATA-SYNCHRONIZATION METHODS FOR UAV-INSPECTION APPLICATIONS

This application claims the benefit of Indian Provisional Patent Application No. 202011028824, filed Jul. 7, 2020, the entire content being incorporated herein by reference.

TECHNICAL FIELD

This disclosure relates to unmanned aerial vehicles (UAVs).

BACKGROUND

Large-scale industrial companies, especially in utilities, oil, and gas, may own hundreds of miles of asset infrastructure (e.g., powerlines, pipelines) that need to be inspected periodically to ensure high productivity. Recently, some entities have begun utilizing small unmanned aerial vehicles (UAVs) to perform these periodic inspections due to the UAVs' ability to quickly collect high-quality data.

SUMMARY

In general, this disclosure relates to systems and techniques for determining when to automatically transfer data between an unmanned aerial vehicle (UAV) and a ground-based computing device. As described herein, a computing system is configured to monitor one or more context states of the UAV in order to determine when the UAV is in an appropriate condition for data transfer. Upon recognizing such a condition, the computing system is configured to automatically transfer the data from the UAV to the ground-based computing device.

In one example, this disclosure describes a method including acquiring data from one or more sensors of an unmanned aerial vehicle (UAV) of a UAV system; storing the data at a local storage device on the UAV; maintaining, by the UAV system, a state machine configured to monitor one or more context states of the UAV system; determining, by a processing circuitry of the UAV system and based on the one or more context states, that a current situation of the UAV system meets minimum criteria for transferring data from the UAV to a ground-based computing device of the UAV system; and automatically transferring, based on the determination, the data from the UAV to the ground-based computing device.

In another example, this disclosure describes a UAV system including a UAV; a ground-based computing device; and processing circuitry configured to acquire data from one or more sensors on the UAV; store the data at a local storage device on the UAV; maintain a state machine configured to monitor one or more context states of the UAV system; determine, based on the one or more context states, that a current situation of the UAV system meets minimum criteria for transferring the data from the UAV to the ground-based computing device; and automatically transfer, based on the determination, the data from the UAV to the ground-based computing device.

In another example, this disclosure describes a non-transitory computer-readable storage medium having instructions stored thereon that, when executed, cause a computing system to acquire data from one or more sensors on an unmanned aerial vehicle (UAV) of a UAV system; store the data at a local storage device on the UAV; maintain a state machine configured to monitor one or more context states of the UAV system; determine, based on the one or more context states, that a current situation of the UAV system meets minimum criteria for transferring data from a UAV to a ground-based computing device; and automatically transfer, based on the determination, the data from the UAV to the ground-based computing device.

The details of one or more examples of the disclosure are set forth in the accompanying drawings and the description below. Other features, objects, and advantages will be apparent from the description, drawings, and claims.

DETAILED DESCRIPTION

Figure 1:
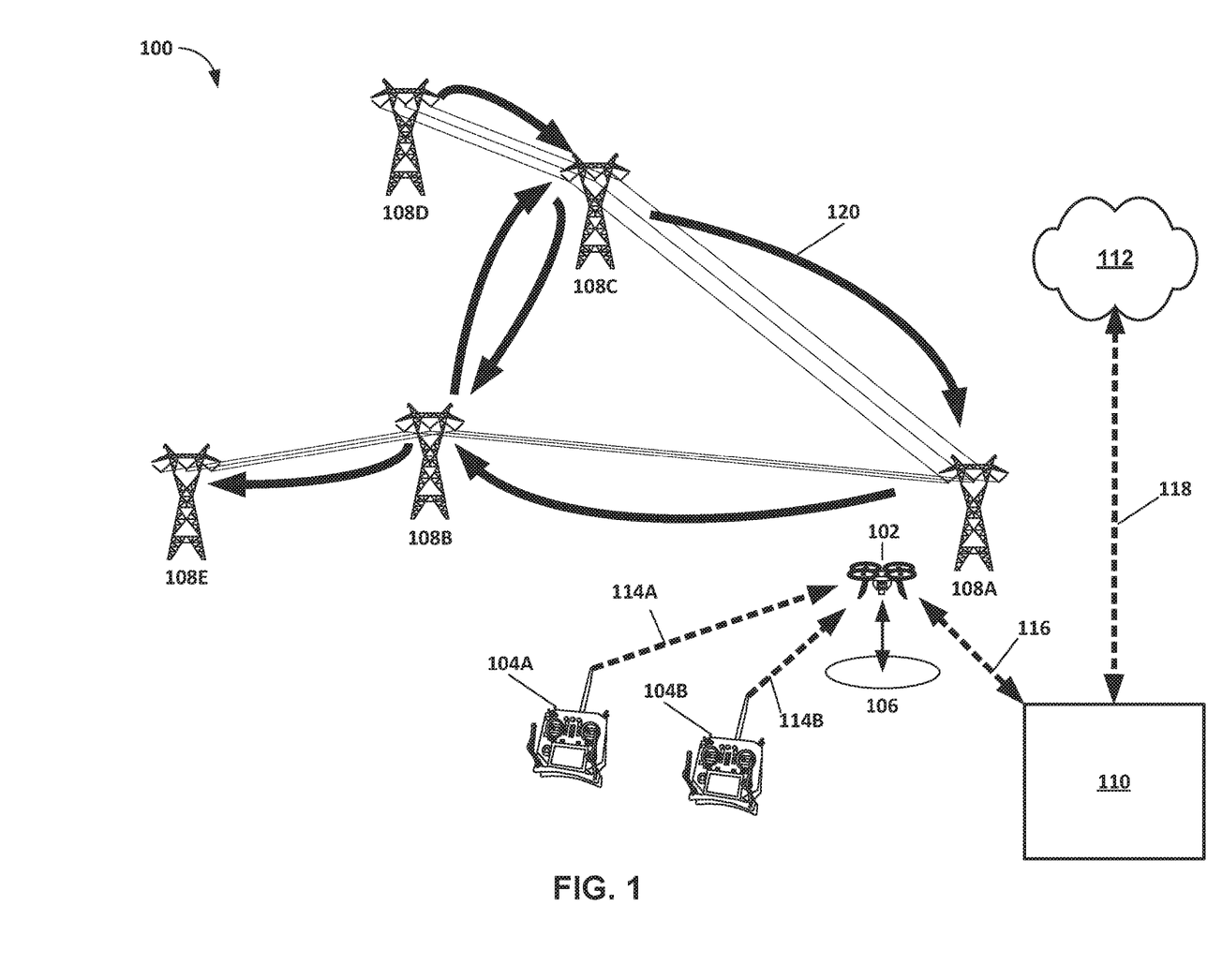
FIG. 1 is a conceptual diagram depicting a UAV system according to techniques of this disclosure.

The present disclosure describes systems and techniques for determining when to automatically transfer data between an unmanned aerial vehicle (UAV) and a ground-based computing device. For example, FIG. 1 is a conceptual diagram depicting a UAV system 100 according to techniques of this disclosure. UAV system 100 includes at least UAV 102, ground-based computing device 110, and remote, distributed, or cloud-based computing network 112.

Large-scale industrial companies, especially in utilities, oil, and gas, may own hundreds of miles of asset infrastructure that need to be inspected periodically to ensure high productivity. Asset infrastructure is depicted in FIG. 1 as powerlines and transmission towers 108A-108E (collectively, "towers 108"), however, asset infrastructure may include any type of extended asset infrastructure, such as powerlines, pipelines, wind turbines, data (e.g., fiber-optic) cables, roads, bridges, power plants, dams, or railroads.

Recently, some entities have begun utilizing small unmanned aerial vehicles (UAVs) 102 to perform these periodic inspections due to the UAVs' ability to quickly collect high-quality telemetry data to evaluate the assets. Telemetry data may include high-resolution image data (e.g., visible-spectrum photographs), x-ray data, magnetic signature data, or any other inspection data.

As shown in FIG. 1, a UAV pilot may use remote control 104A to wirelessly launch UAV 102 from launch site 106. In some examples, but not all examples, system 100 includes a second remote control device 104B for use by a data scientist 428 (FIG. 4) to manage one or more sensors of UAV 102 to collect telemetry data.

UAV 102 is depicted in FIG. 1 as a quadcopter, but UAV 102 may be any type of UAV including, but not limited to, a rotorcraft, compound aircraft such as tilt-rotor, X2 and X3, an aerostat, or any other such type of UAV including all vertical take-off and landing (VTOL), tail-sitter, etc. UAV 102 may be configured to fly with various degrees of autonomy. In some examples, UAV 102 may use light detection and ranging (LIDAR) for collision avoidance.

Although the techniques of this disclosure are not limited to any particular type of UAV, UAV 102 may, for example, be a relatively small, low altitude, and low speed UAV, where in this context, small corresponds to under 55 lbs., low altitude corresponds to operating altitudes less than 400 feet above ground, and low air speed corresponds to air speeds less than 87 knots. Furthermore, it is contemplated that UAV 102 may have hovering capabilities, meaning UAV 102 may have the capability of remaining at an approximately constant location in the air. A UAV controller, such as a pilot, may wirelessly control a flight of UAV 102 via wireless signals 114 transmitted from remote control device 104.

In some cases, UAV 102 may temporarily store collected telemetry data within a memory device that is local to (e.g., integrated within) UAV 102. However, because the data collected during each inspection may be relatively large (e.g., on the order of several terabytes or more), the data must periodically be manually transferred via data connection 116 to a larger data-storage device, such as a ground-based computing device 110, before the UAV's local memory is exhausted (e.g., in between consecutive inspection sessions). For example, ground-based computing device 110 may include a laptop, tablet, personal computer, or other mobile computing device that is local to the UAV pilot or other individuals conducting the UAV inspection. Once the telemetry data is stored within local memory of ground-based computing device 110, it may be wirelessly uploaded via data connection 118 to a remote computing network, such as cloud-based server 112. Accordingly, ground-based computing device 110 may be referred to throughout this disclosure as "middleware device 110," since it is logically situated between UAV 102 and cloud 112 within the data-transfer pipeline.

With some data-transfer techniques that are typical of current UAV inspection systems, there may be any number of inefficiencies, resulting in substantial amounts of wasted time and other resources. For example, the UAV pilot 124 (FIG. 2) or another inspection officer may be required to manually commission (e.g., manage and actuate) a data-transfer interface or application between UAV 102 and ground-based computing device 102 before any transfer of telemetry data. In some cases, this manual commissioning and/or decommissioning process may be scheduled to be conducted within a relatively narrow window or block of time, leaving little room for error in the data-transfer process. The data-transfer process itself may require substantial human intervention, requiring a data scientist or other inspection personnel to manually initiate the data transfer, complete and acknowledge the data transfer, handle exceptions in the event of data failure, and/or re-initiate data transfer in the event of data failure. Any further troubleshooting while out in the field may involve a tedious process that can directly affect the data collection schedule. In more extreme examples, a single data-transfer error may require the inspector to re-initiate the entire data transfer from the beginning. As one representative example, consider a situation in which the UAV telemetry data includes around 60,000 image files copied from 600 file folder structures over the course of an hour or more. At 99% completion of the transfer process, a data-transfer error occurs or is otherwise discovered. The inspector may need to schedule an additional block of time of one or more hours to attempt to re-transfer the entire dataset before UAV 102 may be prepared to conduct a new inspection flight segment.

In some examples in accordance with this disclosure, UAV system 100 includes one or more computing devices configured to automatically manage the data-transfer process between UAV 102, ground-based computing device 110, and/or cloud network 112. For example, UAV system 100 may be configured to maintain a state machine configured to monitor one or more context states of UAV 102 to determine when UAV 102 is in an appropriate condition to conduct part or all of a data transfer. UAV system 100 may actively monitor the condition of UAV 102 so as to automatically pause and resume the data transfer as necessary based on the context states of UAV 102. In this way, UAV system 100 may conduct the data-transfer process according to a flexible and dynamic schedule, rather than a rigidly scheduled block of time. Accordingly, UAV system 100 may be substantially more efficient and less resource-intensive, in terms of both time as well as manpower.

The techniques of this disclosure may provide additional technical solutions and benefits. For example, the techniques of this disclosure may provide for one or more situation-aware, context-sensitive, intelligent and automated mechanisms of: data transfers between UAV 102 and ground-based computing device 110 in case of rapid or tightly scheduled inspection jobs; the ability to reduce the overall depreciation caused by the extensive use of data storage input/output (I/O); advanced computation in case of data failures and mitigation of tedious manual processes; a fully encapsulated data transfer between UAV 102 and ground-based computing device 110 such that the UAV pilot can focus primarily on the inspection jobs; a dynamic ability to adapt to changing circumstances or inspection conditions; and the ability to adapt or learn from experience in case of identifiable data-transfer failures.

Figure 2:
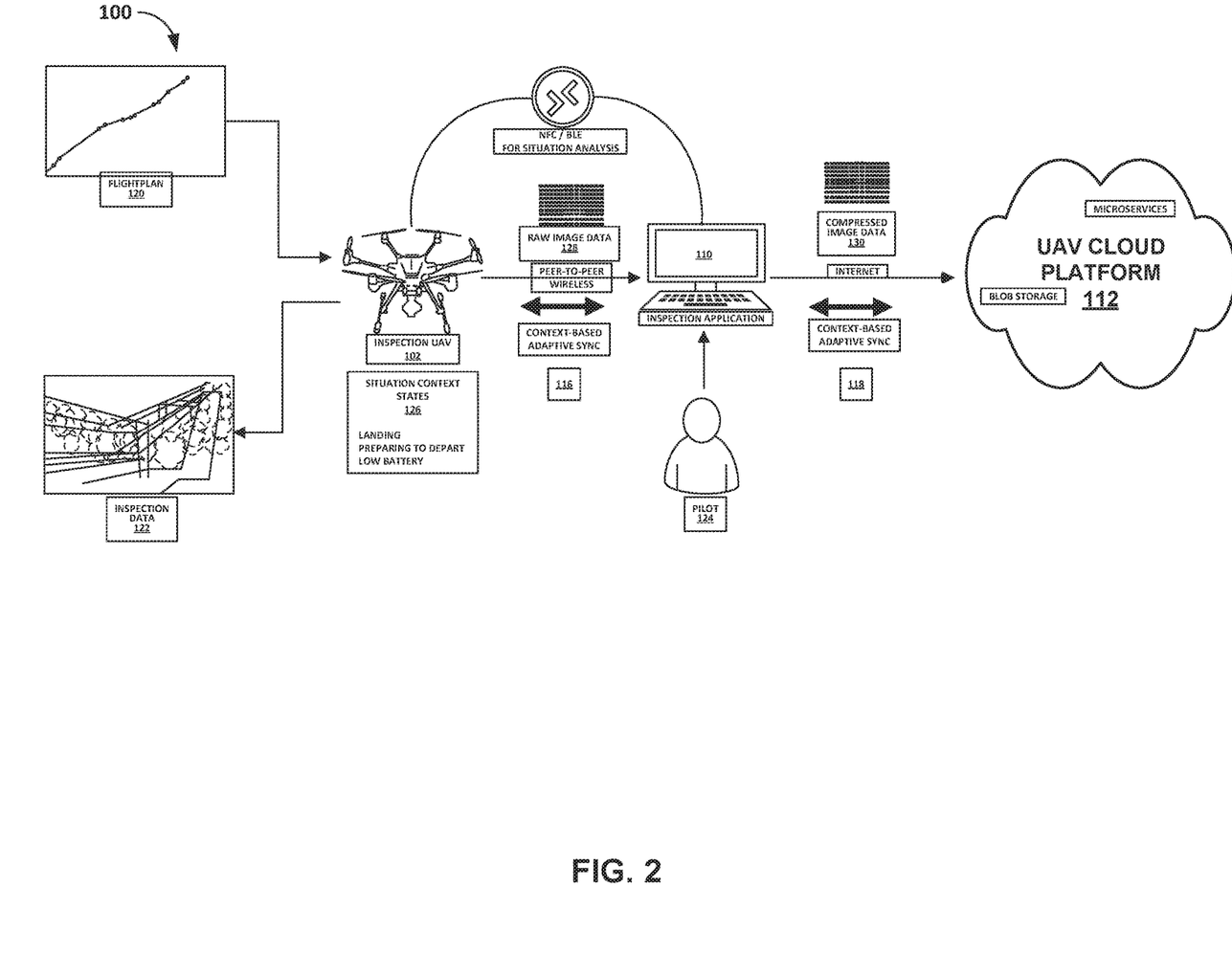
FIG. 2 is a conceptual diagram of the UAV system of FIG. 1.
Figure 3:
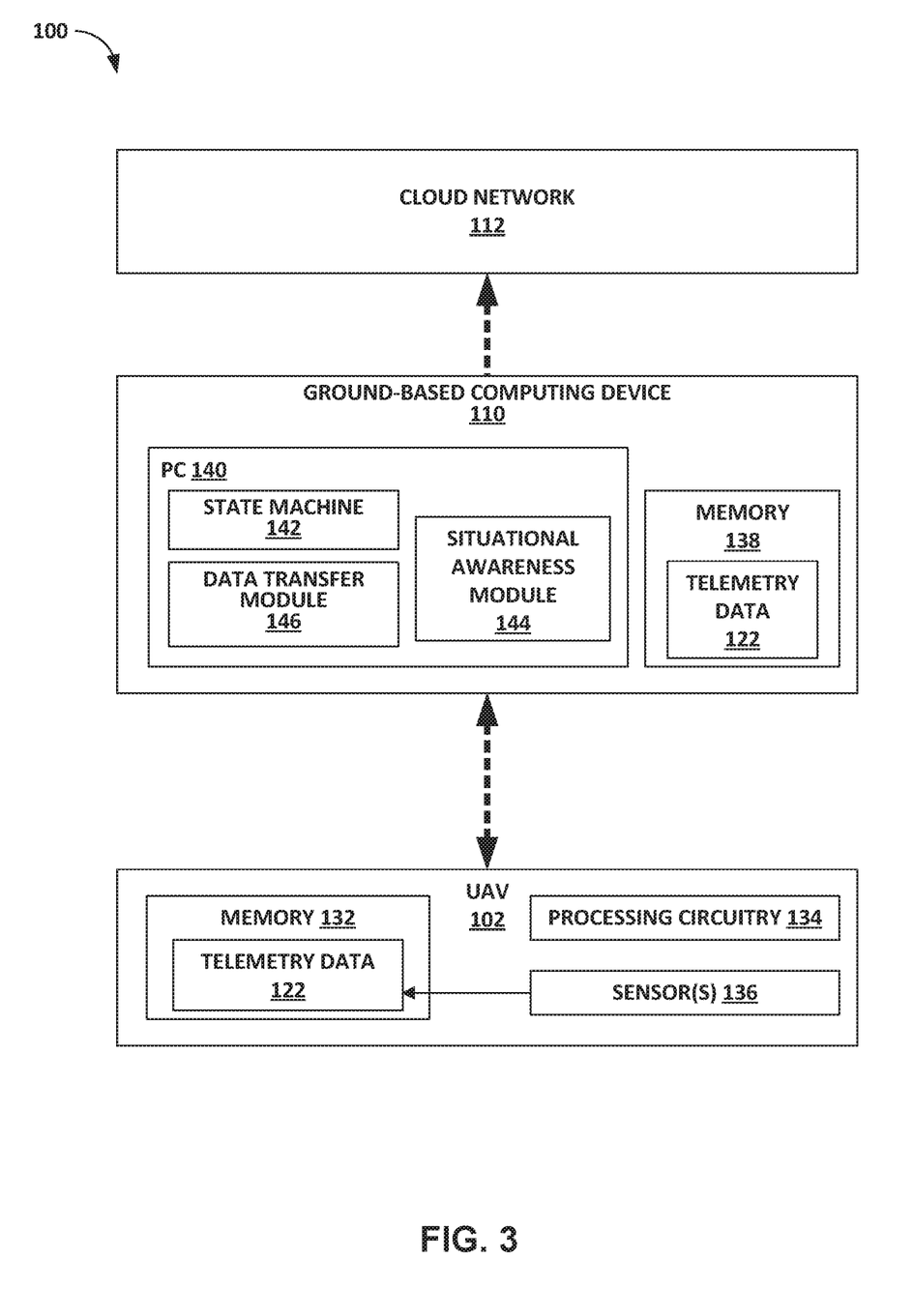
FIG. 3 is a conceptual block diagram of the UAV system of FIG. 1.

FIG. 2 is a conceptual diagram, and FIG. 3 is a block diagram, of UAV system 100 of FIG. 1. As shown in FIGS. 2 and 3, inspection UAV 102 is configured to follow a flightplan or flightpath 120 while using one or more onboard sensors 136 (e.g., image capture devices) to capture inspection telemetry data 122 (e.g., photographs or other sensor data). In the example of FIG. 2, inspection data 122 is depicted as a photograph of electrical transmission lines as seen along flightpath 120. In accordance with techniques of this disclosure, UAV system 100 is configured to selectively and automatically transfer inspection data 122 from local memory 132 of UAV 102 into memory 138 of a ground-based computing device 110. For example, a computing device of system 100, such as processing circuitry 134 within UAV 102 and/or processing circuitry 140 within ground-based computing device 110, maintains a state machine 142 configured to actively monitor one or more situations, conditions, or context states 126 of UAV 102.

As shown in FIG. 2, context states of UAV 102 may include, as non-limiting examples, a flight status of UAV 102 (e.g., flying, landing, preparing to depart, etc.), a battery status of UAV 102 (e.g., full, low, etc.), a location of the UAV (e.g., out in the field, near a no-fly zone, back at a hotel or other designated rendezvous point after an inspection session), a time of day (e.g., during a scheduled inspection time, after work hours, etc.), a status of any wired or wireless data connections currently available to UAV 102, or a telemetry-data-collection status of UAV 102 (e.g., currently collecting telemetry or not currently collecting telemetry data). It is to be understood that this list of context states is merely exemplary; an exhaustive list of potential UAV context states may be virtually limitless.

UAV system 100 is configured to determine, based on any or all of the context states 126 monitored by state machine 142, an appropriate time to automatically transfer inspection data 122 to ground-based computing device 110. For example, a computing device of system 100, such as processing circuitry 134 within UAV 102 and/or processing circuitry 140 within ground-based computing device 110, includes a situational-awareness module 144 configured to continuously receive an updated list of context states 126 from the state machine 142 and evaluate each set of current context states 126. In some examples, the situational-awareness module 144 may include one or more artificial intelligence (AI) or machine-learning-based algorithms trained to identify "ideal" combinations of UAV context states 126, indicating that UAV 102 is currently in a condition (e.g., meets minimum criteria) for data transfer.

In some examples, such as the example depicted in FIGS. 2 and 3, ground-based computing device 110 hosts the situation-awareness module 144. For example, as shown in FIG. 2, ground-based computing device 110 is configured to receive context data 126 from UAV 102 via near-field communication (NFC), Bluetooth Low-Energy (BLE), or any other wireless communication protocol.

In one non-limiting example, the situational-awareness module 144 may identify an "ideal" combination (e.g., a combination meeting minimum criteria) of UAV context states 126 indicating that UAV 102 is (1) not currently collecting telemetry data; (2) is nearing capacity of its internal memory; and (3) has an above-minimum-threshold amount of battery life remaining. As noted above, because the number of possible UAV context states 126 is virtually limitless, the number of possible "ideal" combinations and/or permutations of different sets of context states 126 is similarly virtually limitless. Accordingly, other ideal combinations of context states 126 have been contemplated but are not listed here for the sake of brevity.

In some examples, rather than defining a binary "ideal" or "not ideal" dichotomy for different combinations of context states 126, UAV system 100 may assign a relative score for ranking various combinations of context states 126. For example, one particular set of context states 126 may include nine "good" context states (e.g., states that meet minimum criteria for transferring data) and one "bad" context state (e.g., a state that does not meet minimum criteria for transferring data). UAV system 100 may take further action depending on the relative score, such as transferring only a small portion of the inspection data or transferring the data at a reduced rate.

Once UAV system 100 has identified that UAV 102 is in a condition to transfer inspection data 122, data transfer unit 146 of UAV system 100 may initiate a context-based, adaptive data-synchronization (e.g., "datasync") process. For example, data transfer unit 146 (FIG. 3) causes UAV 102 to automatically initiate the data transfer to ground-based computing device 110 for as long as the situation-awareness module 144 determines that minimum transfer criteria are currently being met. For example, as shown in FIG. 2, UAV system 100 causes UAV 102 to transfer inspection data 122, in the form of raw image data 128, across a wireless, peer-to-peer data-communication connection.

Once ground-based computing device 110 has received raw image data 128 from UAV 110, ground-based computing device 110 (e.g., an inspection application running on ground-based computing device 110) may then automatically compress raw image data 128 into compressed image data 130. Ground-based computing device 110 may then, using similar techniques to those described above, initiate a secondary context-based, adaptive datasync process to upload compressed image data 130 to a remote computing network, such as UAV cloud platform 112. For example, computing device 110 may analyze one or more context states of itself to identify appropriate conditions for uploading image data 130 to cloud 112. For example, computing device 110 may determine that (1) a data transfer from UAV 102 is complete and successful (e.g., no errors), (2) computing device 110 has an active wired or wireless data connection to cloud 112, and (3) computing device 110 is not scheduled for use with another inspection segment within the next hour. These non-limiting examples of context states may indicate good conditions for computing device 110 to upload image data 130 to cloud 112. Cloud 112 may then store image data 130 in the form of Binary Large Object (BLOB) data.

In some examples, UAV system 100 is configured to adapt and "learn" from previous data-transfer failures. For example, in some cases UAV system 100 may identify a failure in transferring the data caused by a context state of the UAV; and automatically update the minimum criteria to account for the context state. As one non-limiting example of this adaptive learning, UAV system 100 may incorrectly evaluate a set of context states to predict or determine that a daily inspection job has been completed, and may initiate the data transfer. In reality the UAV pilot may have gone back out in the field to initiate another inspection job. In such scenarios, UAV system 100 may log (e.g., store in memory) the set of context states resulting in this incorrect assumption, such that similar incorrect assumptions will not be made in the future.

Figure 4:
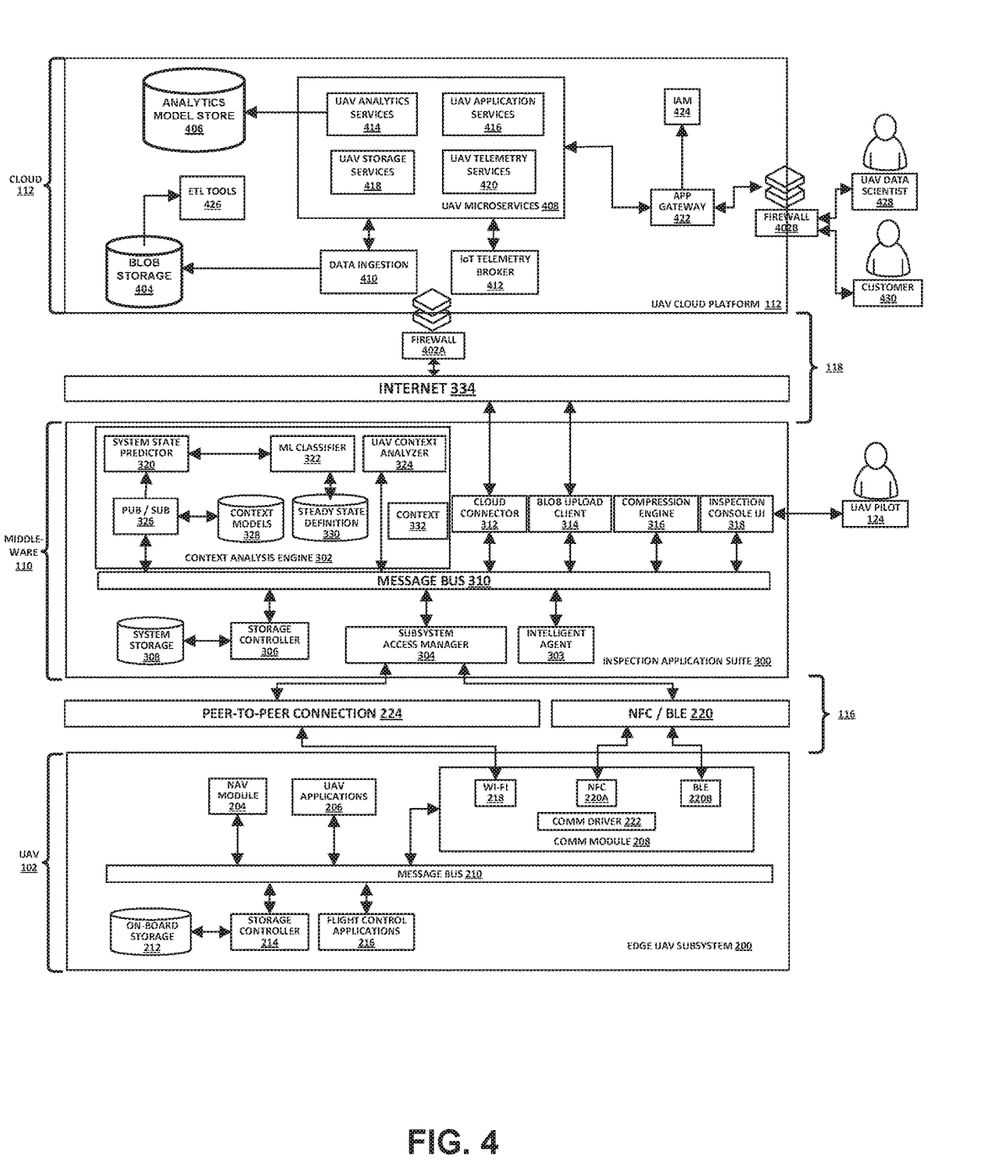
FIG. 4 is a conceptual block diagram of the UAV system of FIG. 1.

FIG. 4 is a conceptual block diagram of example UAV data-synchronization ("datasync") system 400. System 400 may itself be an example of UAV system 100 of FIGS. 1-3. System 400 defines a software architecture paradigm with a set of intelligent methods that scale between the UAV-edge-to-cloud stacks (e.g., UAV 102 to middleware 110 to cloud 112), and provide at least the following capabilities to existing UAV inspection applications: (1) complete encapsulation of the "lift and shift" (e.g., transfer) of inspection data 122 from UAV 102; (2) advanced situational awareness over the unmanned aerial platform (UAP) operations; (3) automatic handling of site issues with full autonomy regarding data and metadata management; (4) intelligent recovery from any crisis and avoidance of any type of data loss; and (5) complete encapsulation of the cloud operations from the UAV pilot.

In some examples, UAV datasync system 400 is built upon the standard Industrial Internet of Things (IIoT) reference architecture and utilizes the capabilities of the IIoT intelligent edge specifications and standards such as Near-Field Communication (NFC), Store and Forward, On-the-Fly Compression, high-fidelity intelligent BLOB upload, encrypted data communication and device management standards.

As shown in FIG. 4, system 400 may be conceptualized as having three logical layers: (1) an edge UAV subsystem 200 of UAV 102; (2) an inspection application suite 332 running on middleware computing device 110; and (3) an intelligent UAV cloud platform 112.

UAV system 400 includes edge UAV subsystem 200. UAV subsystem 200 includes UAV navigation module 204, UAV applications 206, data communication module 208, message bus 210, on-board data storage 212 (e.g., local memory 132 of FIG. 3), storage controller 214, and UAV flight-control applications 216. Communication module 208 further includes wireless data communications capabilities such as Wi-Fi 218, near-field communication (NFC) 220A, and Bluetooth Low Energy (BLE) 220B, as well as a communications driver 222.

Edge UAV subsystem 200 is configured to collect the inspection data 122 (FIG. 2) from sensors 136 (FIG. 3) and store the data within local storage 212 (e.g., memory 132 of FIG. 2), in an indexed manner with the help of storage controller 214. Edge UAV subsystem 200 also collects various parameters related to the local states, conditions, or contexts, of UAV 102 and advertises the information as either telemetry data or non-telemetry data to inspection application suite 300 using pre-configured communication methodologies.

Storage controller 214 maintains a local database 212 of metadata describing inspection data 122 (e.g., raw image data 128). UAV subsystem 200 generates the metadata, which is updated by intelligent agent 303 along with the session manager based upon the successful transfer of data to inspection application suite 300 of middleware device 110.

UAV subsystem 200 uses near-field wireless communication protocols such as Bluetooth Low Energy (BLE), Long-Range (LoRa), ZigBEE, ZWave, NFC, or others to poll the received signal strength (RSS) range, along with other parameters, to learn vicinity parameters of system 400, such as the distance between UAV 102 and ground-based computing device 110. System 400 may use these types of location details to derive one or more of the UAV situation contexts such as, "landing," "take-off," "going to take-off," "system error," "approaching a no-fly zone," "low battery," "conducting an inspection," "halting inspection," "UAV downtime," "undergoing repair," or "system overload," as non-limiting examples. Awareness of these contexts helps enable a seamless data transfer across the subsystems.

UAV system 400 includes inspection application suite 300 running on middleware computing device 110. Inspection application suite 300 includes context analysis engine 302, intelligent agent 303, subsystem access manager 304, storage controller 306, system storage 308 (e.g., local memory 138 of FIG. 3), message bus 310, cloud connector 312, binary large object (BLOB) upload client 314, compression engine 316, and inspection console user interface (UI) 318. Context analysis engine 302 further includes system state predictor, machine-learning (ML) classifier 322, UAV context analyzer 324, publish-subscribe (Pub/Sub) unit 326, context models 328, steady-state definitions 330, and UAV context 332 (e.g., context states 126 of FIG. 2).

Inspection application suite 300 includes UAV context analysis engine 302, which may be an example of state machine 142 and/or situational awareness module 144 of FIG. 3. For example, context analysis engine 302 includes UAV context analyzer 324. Inspection application suite 300 utilizes a data link connection, such as peer-to-peer connection 224, to continuously monitor various system contexts 332 of inspection UAV 102 in order to trigger data-transfer sessions appropriately. Inspection application suite 300 includes a subsystem access manager 304, which includes one or communication mediums to access advertisements over the context-object data from UAV 102. Context-analysis engine 302 includes one or more machine-learning applications, along with system-state predictor 320, based upon the historical data along with Pub/Sub 326.

In some examples, multiple data sessions can be maintained independent of the job count, based upon the availability of the UAV onboard data, such that UAV pilot 124 enjoys increased encapsulation (e.g., resulting in a simplified user-interface) of the "lift-and-shift" (e.g., transfer) of data, which is entirely under the automatic control of UAV subsystem 200 and inspection application 300. Inspection application suite 300 includes the edge software development kit (SDK) of UAV Cloud Platform 112 deployed within itself, through which inspection application suite 300 may utilize component services such as cloud connector 312 and file-upload service (e.g., BLOB upload client 314) in a secure manner.

Using the edge Internet of Things (IoT) services, inspection application suite 300 may initiate, suspend, and resume the file upload to cloud 112 in a streamable manner based upon local system context of middleware device 110. Inspection application suite 300 includes an on-the-fly compression engine 316 which will be used to compress the raw image data 128 into compressed image data 130 (FIG. 2) before uploading the data to the cloud 112. UAV pilot 124 may experience significantly improved encapsulation of the data transfer process, particularly regarding when and how the data upload to the UAV cloud platform 112 occurs, which will be totally automated and maintained by the inspection application suite 300 rather than manually by pilot 124 or another user. System 400 includes advanced state-management capabilities such as exponential re-tries to resume from a transport-level exception or internet timeout with a help of a watchdog service. As used herein, "exponential re-tries" refers to an iteratively increasing window of time in between consecutive attempts to transfer data after detecting a failure. System 400 may be configured to intelligently determine and inform, based on monitored context states of the UAV, how much time to wait in between successive data-transfer attempts. For example, the monitored context states may indicate that an existing cause of the data-transfer failure is likely to soon be resolved. Accordingly, system 400 may configure the delay in between successive transfer attempts to remain relatively short in duration. However, if the monitored context states indicate a significant cause of data transfer failures (e.g., a complete outage of one or more components), system 400 may configure a significant exponential increase in time between successive transfer attempts. Additionally, inspection application suite 300 includes a diagnostic user interface (UI) 318, enabling UAV pilot 124 to perform any necessary diagnostic operations.

Context-analysis engine 302 includes situation-analysis capability and Industrial Internet of Things (IIoT) edge capabilities such as cloud connection 312, Firmware Update (FUP) or Over-The-Air Update (OTA), and system command. Inspection application 300 uses context analyzer 324 to continuously monitor various situational contexts 332 of UAV 102 based upon various system states. In some examples, UAV 102 includes a daemon service that advertises its state along with the local context to the registered inspection application 300 through various mediums. Based upon the situation context, inspection application 300 is able to establish a data transfer, suspend the data transfer, resume the data transfer, and abort the data transfer and secure the data transmission channel with the UAV daemon service.

Inspection application 300 maintains a plurality of internal data sessions with UAV 102 based upon the UAV arrivals, departures, suspensions, sleep mode, or other UAV context states, which remains entirely opaque (e.g., fully encapsulated, or behind-the-scenes) to UAV pilot 124. For example, in typical UAV data-transfer systems (e.g., manual data transfer), the amount of time required to transfer the data from the UAV may be significantly higher than the amount of time to actually conduct the inspection, due to multiple iterations (e.g., attempts) of the data transfer and other error conditions. In some examples in accordance with this disclosure, inspection application 300 includes intelligent agent 303 that manages a context-based, IoT connection with cloud data-ingestion adapter 410. Intelligent agent 303 may include a relatively broad file system capability.

For example, intelligent agent 303 manages data sessions between the middleware device 110 and the UAV system 200 based upon the situation context 314. In some examples, the data session is invoked or initiated by middleware device 110. Intelligent agent 303 further includes full, autonomous rollback capability to restore the telemetry data back in the event of an exception (e.g., an error) during the data-transfer session. In such cases, inspection application suite 300 may identify a subset of the data that contained the error, and re-transfer that subset of the data to eliminate the error.

Inspection application 300 may perform an on-the-fly compression and encryption (e.g., via compression engine 316) before transmitting a relatively large volume of data over the cloud pipeline in multiple sessions based upon local contexts, such as "Arrived at Hotel," "Going into Sleep Mode," "Persistent Internet Available," "Internet is Very Slow, Suspend the Upload," "Ideal Time for Data Upload," "Ready for Next Inspection," as non-limiting examples. Inspection application 300 is able to pause, suspend, and/or resume data-transfer sessions, even for very large volumes of data across multiple sessions, with complete encapsulation of the data-transfer process from the perspective of UAV pilot 124 or other user.

In some examples, UAV context analyzer 324 may organize context data 332 into two categories: discrete events and continuous events. A "discrete" event is defined as an event that occurs at time "t" and time "t+p," such that there are considered to have been two separate (e.g., "discrete") event instances. A "continuous" event is defined as an event instance lasting for at least time "p," wherein an event occurring at time "t" and at time "t+p" cannot be considered as two separate events. Accordingly, system 400 is configured to correlate one or more of the following attributes, along with the live stochastic data, to derive situation or context data 332: UAV ontology data; UAV super-system data; UAV sub-system data; UAV performance metrics; or other physical or logical dimensions of UAV 102.

UAV system 400 includes intelligent UAV cloud platform 112. UAV cloud platform 112 includes firewalls 402A, 402B, binary large object (BLOB) storage 404, analytics model storage 406, UAV microservices 408, data ingestion adapter 410, Internet-of-Things (IoT) telemetry broker 412, app gateway 422, and identity and access management (IAM) 424. UAV microservices 408 further include UAV analytics services 414, UAV application services 416, UAV storage services 418, and UAV telemetry services 420.

UAV cloud platform 112 includes data ingestion adapter 410 and IoT telemetry message broker 412, which will "listen" for telemetry messages from various UAV inspections occurring in the field. UAV cloud platform 112 also includes endpoints to receive the data stream uploads from inspection application 300, such as via the Internet 334. The endpoints may be associated with Binary Large Object (BLOB) data storage 404 or other containerized storages. As used herein, a containerized storage refers to applications or services which may be packaged to function in platform-agnostic environments, particularly with regard to technology such as dockers. UAV cloud platform 112 includes a complete Extract-Transform-Load (ETL) pipeline, including ETL tools 426, available to process inspection data 122 (FIG. 2) from data storage 404, which is able to delegate the processed data to various machine-learning applications to generate context inferences. For example, if UAV 102 returns from an inspection session late in the evening, the time of day likely indicates the end of the daily inspection job schedule. Accordingly, system 400 may generate a context inference that UAV 102 is likely in a condition to complete an uninterrupted data transfer.

UAV cloud platform 112 includes a common operational dashboard (e.g., app gateway 422) configured to allow a user to monitor the state of the UAV inspection data 122 at any given time and without regard to its processing at the Edge Device Layer. In some cases, multiple users, such as a data scientist 428 or an end user (e.g., customer 430) will have access to their respective data or associated dashboards through a common identity and access management (IAM) unit 424. In accordance with the techniques of this disclosure, UAV inspection operations may become more productive and enable the UAV Pilot 124 to enjoy increased encapsulation from the "lift and shift" of inspection data 122.

Figure 5:
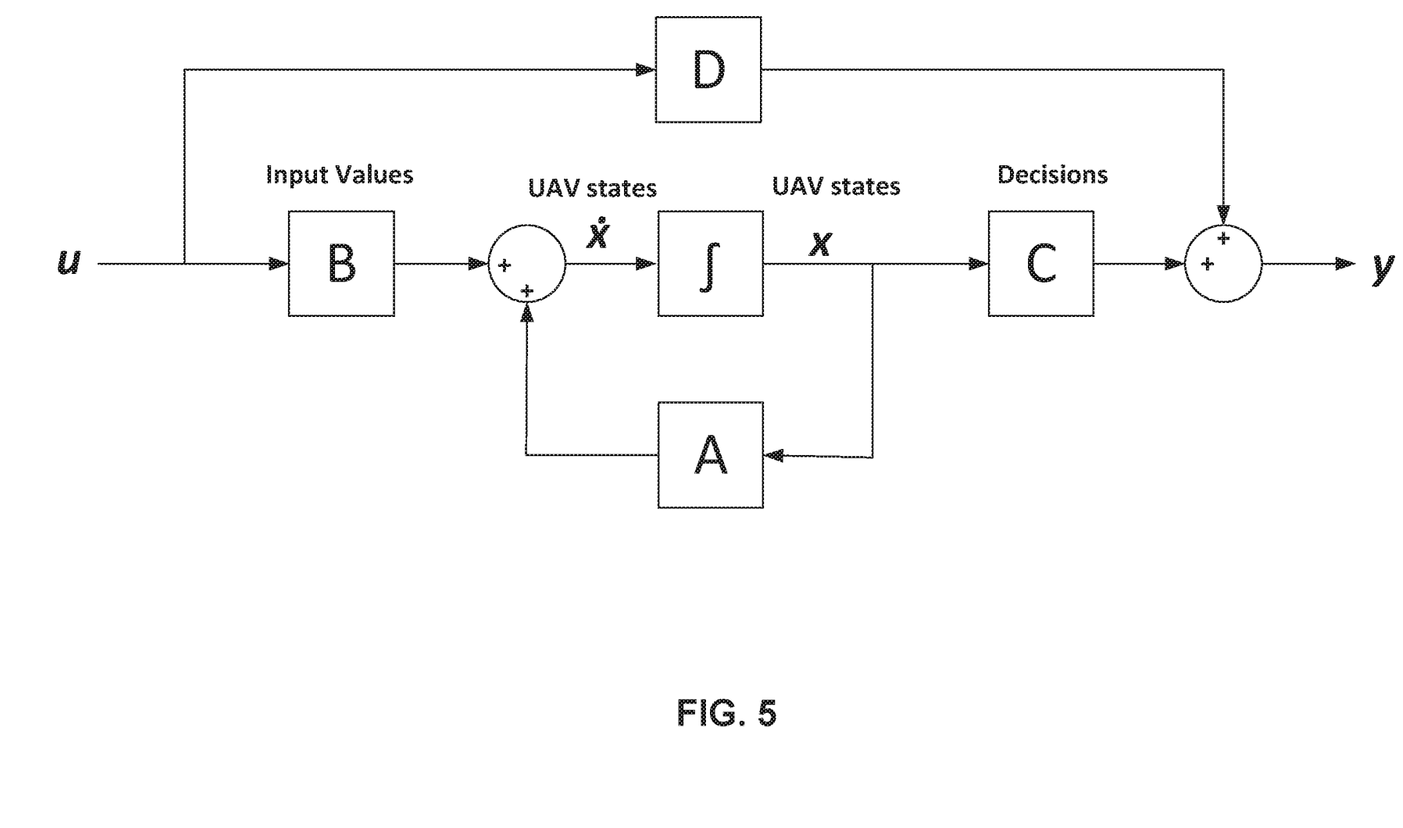
FIG. 5 is a conceptual flow diagram depicting a process of analyzing context states of a UAV, according to techniques of this disclosure.

FIG. 5 is a conceptual flow diagram illustrating an example mathematical-based process for analyzing context states of a UAV in order to determine when to automatically transfer telemetry data to a ground-based computing device, according to techniques of this disclosure. One or more operations depicted in FIG. 5 may be performed by UAV system 100 (e.g., by state machine 142 and/or situational awareness module 144) of FIG. 1. System 100 is configured to receive a number of inputs, represented by the variable p, including n context-state variables, and generate a corresponding number of outputs, represented by the variable q. Based on these three variables, system 100 may define the following eight elements:

x(t) is a state vector, wherein $x(t) \in \mathbb{R}^n$;

y(t) is an output vector, wherein $y(t) \in \mathbb{R}^q$;

u(t) is an input vector or a control vector, wherein $x(t) \in \mathbb{R}^p$;

A(t) is a state matrix, having the dimensions $\dim[A(t)] = n \times n$;

B(t) is the input matrix, having the dimensions $\dim[B(t)] = n \times p$;

C(t) is the output matrix, having the dimensions $\dim[C(t)] = q \times n$;

D(t) is the feedforward matrix, having the dimensions $\dim[D(t)] = q \times p$; and $\dot{x}(t)$ is the time derivative of x(t), i.e., $\dot{x}(t) = d/dt\,(x(t))$.

Each of the above eight vectors and matrices includes a set of variables, each variable representing a scaled numerical value indicative of a context state or status of UAV system 100. For example, state matrix A(t) represents at least one inspection status of system 100, including a flight status of UAV 102 (FIG. 1), such as "landed," "conducting an inspection," etc. Input matrix B(t) contains a set of all possible (e.g., monitored) context states for UAV 102 (FIG. 1), such as "low battery," "data storage full," "temperature too hot," etc. Output matrix C(t) contains a set of possible conclusions or determinations based on the evaluation of the inspection status, flight status, and other monitored context states of UAV 102. For example, output matrix C(t) may include the status determinations of "Initiate data transfer," "Do not initiate data transfer," "Pause data transfer," "Resume data transfer," "Conclude data transfer," "Report successful data transfer," etc. As shown in FIG. 5, feedforward matrix D(t) directs a bypass scenario in which one or more specific context states input from u(t) is directly correlated with a particular output y(t), such that no further analysis is necessary. As one non-limiting example, a given context-state input u(t) may include a "wireless connection unavailable" context state, which may be directly correlated via feedforward matrix D(t) to an output y(t) indicating one of "Do not initiate data transfer," or "Pause data transfer," depending on whether the data transfer has already been initiated. In cases in which UAV system 100 does not have a direct feedthrough (e.g., preconfigured direct input-output correlations), D(t) is the zero matrix.

As represented graphically in FIG. 5, system 100 may perform the following two operations in order to represent the context-state space of UAV 102 and determine the output vector y(t):

$$\dot{x}(t) = A(t)x(t) + B(t)u(t) \quad (1)$$

$$y(t) = C(t)x(t) + D(t)u(t) \quad (2)$$

Specifically, system 100 receives, detects, or monitors context states of UAV 102, and based on the context states, generates input vector u(t). System 100 multiplies input vector u(t) by input matrix B(t) to produce B(t)u(t). System 100 then integrates this result to derive x(t), and then multiplies x(t) by state matrix A(t) to derive A(t)x(t). System 100 then adds the two products together to derive X(t). Similarly, system 100 multiples input vector u(t) with feedforward matrix D(t) (in the event that D(t) is non-zero) to derive D(t)u(t), e.g., indicative of any output values y that are direct correlations to corresponding input values u. System 100 then multiplies the previously derived state vector x(t) by output matrix C(t) to derive C(t)x(t). System 100 then combines C(t)x(t) with D(t)u(t) to derive the output vector y(t) indicating a determination of whether to automatically transfer telemetry data from the UAV.

Figure 6:
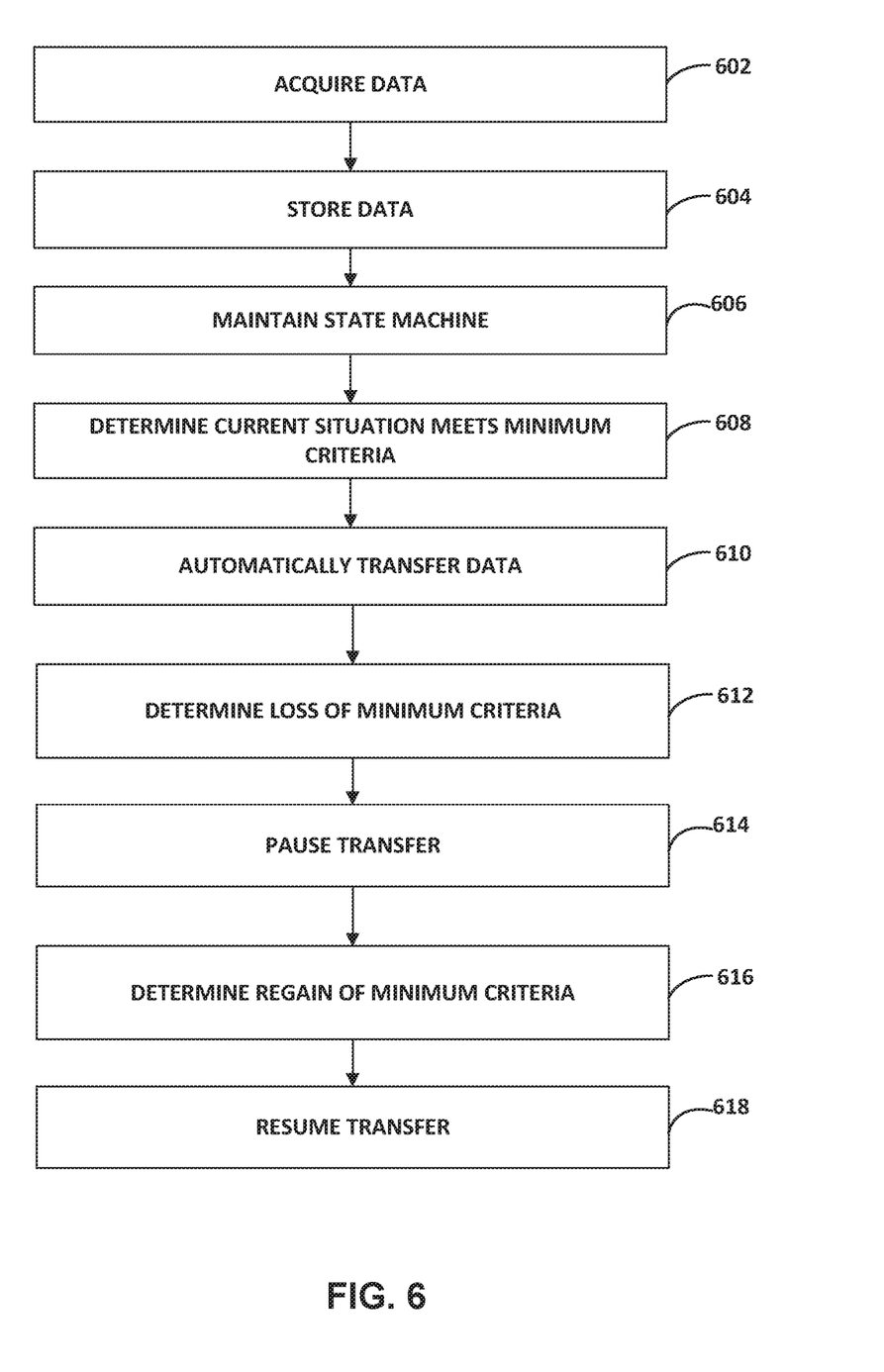
FIG. 6 is a flowchart illustrating an example operation according to the techniques of this disclosure.

FIG. 6 is a flowchart illustrating an example operation according to the techniques of this disclosure. The operation of FIG. 6 is described with respect to system 100 of FIGS. 1-3, however, any suitable system may perform the techniques herein. One or more sensors 136, such as image capture devices, onboard a UAV 102, acquire inspection data 122, such as high-resolution image data 128 (602). The inspection data 122 may initially be stored within a local memory device 132 of UAV 102 (604). Meanwhile, a computing device, such as ground-based computing device 110 (or alternatively, processing circuitry 134 internal to UAV 102) maintains a state machine 142 configured to monitor one or more context states 126 of UAV 102 (606). UAV context states 126 may include, as non-limiting examples, a flight status of UAV 102, a data-collection status of UAV 102, a current location of UAV 102, a current battery status of UAV 102, or any other state of UAV 102 that is relevant to the current ability of UAV 102 to transfer inspection data 122 to memory 138 of ground-based computing device 110.

A computing device, which may be the same computing device running state machine 142, includes a situational-awareness module 144 configured to receive the context states from state machine 142 and evaluate each current set of context states 126. For example, situational-awareness module 144 may include one or more machine-learning algorithms trained to receive a particular combination of current context states 126 and recognize that a particular combination of context states 126 meets a set of minimum criteria, indicating that UAV 102 is likely in a "good" condition for transferring the collected inspection data 122 to ground-based computing device 102 (608). For example, situational-awareness module may identify that UAV 102 is not currently collecting additional inspection data 122, has sufficient battery life to complete a data transfer, and has a sufficiently strong wireless data connection (e.g., upload/download speed) with ground-based computing device 102. In response to situational-awareness module 144 determining that the minimum data-transfer criteria have been met, a data-transfer module 146 may cause UAV 102 to automatically initiate the data transfer to ground-based computing device 110 (610).

Throughout the data-transfer process, situational-awareness module 144 may continue to receive updated context states 126 from state machine 142. At any point, situational-awareness module 144 may determine that an updated set of context states 126 no longer meets minimum criteria for transferring data, or similarly, that context states 126 indicate a trajectory toward imminently not meeting minimum criteria (612). As one non-limiting example, situational-awareness module 144 may identify that a battery life of UAV 102 is running low, and although the data-transfer process is not currently affected, the transfer process may be affected before the data-transfer process is complete. In such cases, data-transfer module 146 may safely pause the data transfer to prevent loss or corruption of inspection data 122 (614). Situational-awareness module 144 may continue to monitor updated context states 126 from state machine 142 to determine when the set of minimum criteria have been regained (616). For example, situational-awareness module 144 may identify that UAV pilot 124 has plugged UAV 102 into a power source to charge the battery, and that no other current context states 126 indicate inhibitions to the data-transfer process. In such cases, data-transfer module 146 may resume the data transfer from UAV 102 to ground-based computing device 100 until the data transfer is complete (618). Once the data transfer is complete, data-transfer module 146 may output a notification or other indication of the completed data transfer.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Cloud technology used to automatically save the images on web server is not limited to local or global internet cloud. It can be a private and/or public cloud which is protected by the user ID and passwords. The passwords may not limit to one or two.

Various examples have been described. These and other examples are within the scope of the following claims.

What is claimed is:

1. A method comprising:
    acquiring data from one or more sensors of an unmanned aerial vehicle (UAV) of a UAV system;
    storing the data at a local storage device on the UAV of the UAV system;
    maintaining, by the UAV system, a state machine configured to monitor one or more context states of the UAV system;
    retrieving, by processing circuitry of the UAV system, the one or more context states from the state machine;
    determining, by the processing circuitry of the UAV system and based on the one or more context states monitored by the state machine, that a current situation of the UAV system meets minimum criteria for transferring data from the UAV to a ground-based computing device of the UAV system; and
    automatically transferring, based on the determination, the data from the UAV to the ground-based computing device.

2. The method of claim 1, wherein the one or more context states comprise:
    a remaining battery life of the UAV;
    a battery recharging status of the UAV;
    a location of the UAV;
    a time of day
    a current flight status of the UAV;
    a flight schedule of the UAV;
    a wired or wireless data connection available to the UAV; or
    a telemetry-data-collection status of the UAV.

3. The method of claim 1, wherein automatically transferring the data comprises initiating a transfer of the data, the method further comprising:
    determining, by the processing circuitry based on the one or more context states, that the current situation of the UAV no longer meets minimum criteria for transferring telemetry data from the UAV; and
    automatically pausing, based on the determination, the transfer of the data from the UAV to the ground-based computing device.

4. The method of claim 3, further comprising:
    determining, by the processing circuitry based on the one or more context states, that the current situation of the UAV system once again meets minimum criteria for transferring telemetry data from the UAV; and
    automatically resuming the transfer, based on the determination, of the data from the UAV to the ground-based computing device.

5. The method of claim 1, wherein the data comprises Binary Large Object (BLOB) telemetry data.

6. The method of claim 1, further comprising:
    identifying a failure in transferring the data caused by a context state of the UAV; and
    automatically updating the minimum criteria to account for the context state.

7. The method of claim 1, further comprising:
    identifying an error within the data transferred to the ground-based computing device;
    determining, by the processing circuitry based on the one or more context states, that the current situation of the UAV system meets the minimum criteria; and
    automatically re-transferring, based on the determination, a subset of the data that contained the error from the UAV to the ground-based computing device to replace the error in the data.

8. The method of claim 1, wherein determining that the current situation of the UAV system meets the minimum criteria for transferring the data comprises:
    determining, based on the one or more context states, an input vector, a state vector, an input matrix, and a state matrix;
    determining, based on the input vector, the state vector, the input matrix, and the state matrix, an output vector; and
    determining, based on the output vector, that the current situation of the UAV system meets the minimum criteria for transferring the data.

9. The method of claim 1, wherein the one or more context states of the UAV comprise at least a flight status of the UAV, wherein the flight status comprises:
    landing;
    takeoff;
    preparing to take off;
    conducting an inspection during a flight; or
    approaching a no-fly zone during a flight.

10. The method of claim 1, wherein determining, by the processing circuitry based on the one or more context states, that the current situation of the UAV system meets minimum criteria for transferring data from the UAV comprises applying, by the processing circuitry, a machine-learning based algorithm to the one or more context states.

11. An unmanned aerial vehicle (UAV) system comprising:
a UAV;
a ground-based computing device; and
processing circuitry configured to:
acquire data from one or more sensors on the UAV;
store the data at a local storage device on the UAV;
maintain a state machine configured to monitor one or more context states of the UAV system;
retrieve the one or more context states from the state machine;
determine, based on the one or more context states, that a current situation of the UAV system meets minimum criteria for transferring the data from the UAV to the ground-based computing device; and
automatically transfer, based on the determination, the data from the UAV to the ground-based computing device.

12. The UAV system of claim 11, wherein the one or more context states comprise:
a remaining battery life of the UAV;
a battery recharging status of the UAV;
a location of the UAV;
a time of day
a current flight status of the UAV;
a flight schedule of the UAV;
a wired or wireless data connection available to the UAV; or
a telemetry-data-collection status of the UAV.

13. The UAV system of claim 11, wherein automatically transferring the data comprises initiating a transfer of the data, the processing circuitry further configured to:
determine, by the situational-awareness module based on the one or more context states, that the current situation of the UAV no longer meets minimum criteria for transferring telemetry data from the UAV; and
automatically pause the transfer, based on the determination, of the telemetry data from the UAV to the ground-based computing device.

14. The UAV system of claim 13, the processing circuitry further configured to:
determine, based on the one or more context states, that the current situation of the UAV system once again meets minimum criteria for transferring telemetry data from the UAV; and
automatically resume the transfer, based on the determination, of the data from the UAV to the ground-based computing device.

15. The UAV system of claim 11, wherein the data comprises Binary Large Object (BLOB) telemetry data.

16. The UAV system of claim 11, the processing circuitry further configured to:
identify a failure in transferring the data caused by a context state of the UAV; and
automatically update the minimum criteria to account for the context state.

17. The UAV system of claim 11, the processing circuitry further configured to:
identify an error within the data transferred to the ground-based computing device;
determine, based on the one or more context states, that the current situation of the UAV system meets the minimum criteria; and
automatically re-transfer, based on the determination, a subset of the data that contained the error from the UAV to the ground-based computing device to replace the error in the data.

18. The UAV system of claim 11, the processing circuitry configured to determine that the current situation of the UAV system meets the minimum criteria for transferring the data by:
determining, based on the one or more context states, an input vector, a state vector, an input matrix, and a state matrix;
determining, based on the input vector, the state vector, the input matrix, and the state matrix, an output vector; and
determining, based on the output vector, that the current situation of the UAV system meets the minimum criteria for transferring the data.

19. The UAV system of claim 11, wherein the one or more context states of the UAV comprise at least a flight status of the UAV, wherein the flight status comprises:
landing;
takeoff;
preparing to take off;
conducting an inspection during a flight; or
approaching a no-fly zone during a flight.

20. An unmanned aerial vehicle (UAV) system comprising:
a UAV;
a ground-based computing device; and
processing circuitry configured to:
acquire data from one or more sensors on the UAV;
store the data at a local storage device on the UAV;
maintain a state machine configured to monitor one or more context states of the UAV system;
retrieve the one or more context states from the state machine;
determine, based on the one or more context states, that a current situation of the UAV system meets minimum criteria for transferring the data from the UAV to the ground-based computing device, wherein the processing circuitry is configured to determine that the current situation of the UAV system meets the minimum criteria for transferring the data by:
determining, based on the one or more context states, an input vector, a state vector, an input matrix, and a state matrix;
determining, based on the input vector, the state vector, the input matrix, and the state matrix, an output vector; and
determining, based on the output vector, that the current situation of the UAV system meets the minimum criteria for transferring the data; and
automatically transfer, based on the determination, the data from the UAV to the ground-based computing device.

* * * * *